United States Patent [19]

Murata et al.

[11] 3,816,256

[45] June 11, 1974

[54] PROCESS FOR PRODUCING MICROBIAL PROTEIN FROM HYDROCARBON

[75] Inventors: Katsuhide Murata; Masaharu Takahataka, both of Ichibarashi; Kazuo Kakutani; Sigezo Uedono, both of Osaka, all of Japan

[73] Assignee: Mitsui Shipbuilding and Engineering Co., Ltd., Tokyo, Japan

[22] Filed: Dec. 15, 1972

[21] Appl. No.: 315,442

[52] U.S. Cl. ................................... 195/30, 195/82
[51] Int. Cl. ............................................ C12d 13/00
[58] Field of Search ....................... 195/30, 28 R, 82

[56] References Cited
UNITED STATES PATENTS
3,642,578  2/1972  Hitzman et al. .................... 195/28 R

OTHER PUBLICATIONS

Bailey, Industrial Oil and Fat Products, Pages 325 and 326, (1945).

Primary Examiner—Alvin E. Tanenholtz
Attorney, Agent, or Firm—Howson and Howson; William E. Hedges

[57] ABSTRACT

Process for producing microbial protein from hydrocarbons wherein a microorganism is cultured in a carbon source obtained by saponifying an oxidation reaction product obtained by liquid phase oxidation of the hydrocarbons.

1 Claim, 1 Drawing Figure

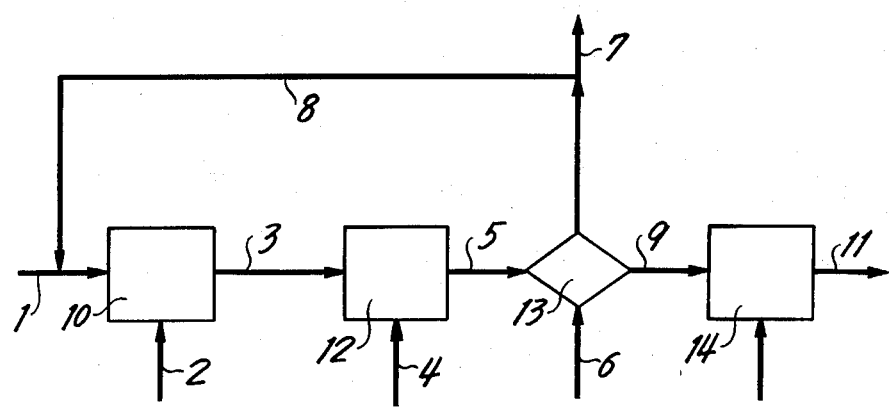

As for amino acid constitution, it was not inferior to that of petroleum protein obtained by conventional method. Further, according to the present invention, aliphatic esters may be used as starting material. In such a case, the oxidation step may be omitted and other steps are carried out in the same manner as above.

EXAMPLE 1

|  | % (by weight) |
|---|---|
| $n - C_{12}H_{26}$ | 16.4 |
| $n - C_{13}H_{28}$ | 50.2 |
| $n - C_{14}H_{30}$ | 32.9 |
| $n - C_{15}H_{32}$ | 0.1 |
| $n - C_{16}H_{34}$ | 0.4 |

2.5 liters of the above hydrocarbon composition was charged in a 5 liter autoclave and subjected to liquid phase oxidation at a temperature of 130°C under a pressure of 20 Kg/cm$^2$-gauge in the absence of catalyst for 5 hours while air was introduced at a rate of 2,500 cc/min, so that oxidation product having a saponification value of 152 (mg-KOH/g) is obtained. 3N-sodium hydroxide was added in a quantity of 1 cc per 1 gram of the resulting oxidation product and saponification was carried out at a temperature of 110° C under a pressure of 2 atms for one hour. The resulting saponification reaction product was further added with water in a quantity of 2cc per 1cc of the product. The mixture was stirred and stayed in still state to separate 85 percent of the whole saponification reaction product as water-soluble substance, leaving 15 percent remainder as hydrophobic substance. The water-soluble saponification reaction product thus obtained was used as carbon source for the microorganism culture. The culture was effected by using a culture liquid of the following composition. A yeast of genus Candida was used as microorganism. Composition of culture liquid:

| Water-soluble saponification reaction product | 2% |
|---|---|
| $NH_4NO_3$ | 3.2g |
| $Na_2HPO_4 \cdot 12H_2O$ | 1.0g |
| $KH_2PO_4$ | 2.5g |
| $MgSO_4 \cdot 7H_2O$ | 0.5g |
| $CaCl_2$ | 0.1g |
| Yeast extract | 0.1g |
| City water | 1,000.0 ml |
| pH | 6.5 |

Aerated culture under stirring was effected at 30°C by using culture liquid of the above composition. The maximum growth was attained after 7 – 12 hours. Dry microbe of the yeast obtained amounted to 20g. Protein content of the product was 62 percent. Essential amino acid composition was as follows:

| Lysine | 7.1 |
|---|---|
| Methionine | 1.7 |
| Cystine | 0.7 |
| Isoleucine | 4.8 |
| Leucine | 7.3 |
| Phenylalanine | 4.7 |
| Threonine | 4.9 |
| Tryptophane | 1.2 |
| Valine | 5.4 |

Thus, excellent results are obtained if the saponification reaction product is used as carbon source.

EXAMPLE 2

Hydrocarbons of the following properties obtained by thermal decomposition of low polymers obtained as by-produced polymers in polyethylene production were oxidized in liquid phase under the same conditions as in Example 1, then saponified and stayed in still state to divide into 87 percent, based on the saponification reaction product, of a water-soluble component and 13 percent of hydrophobic component.

| Carbon | 85.7 wt.% |
|---|---|
| Hydrogen | 14.3 wt.% |
| Average molecular weight | 205 |
| Iodine value | 50.9 g – $I_2$/100g |
| Specific gravity (15/4°C) | 0.790 |
| Mole average boiling point | 228°C |

The same yeast as in Example 1 was cultured by using the water soluble saponification reaction product as carbon source in the same manner as in Example 1 to obtain 78g of dry microbe per 100g of the water soluble saponification reaction product. In the same manner, a bacterium of genus Pseudomonas was cultured to obtain 80 percent, based on the saponification reaction product, of dry microbe. Essential amino acid composition and protein content of the product were as follows:

Essential amino acid composition:

| Lysine | 6.54 |
|---|---|
| Methionine | 1.91 |
| Cystine | 0.6 |
| Isoleucine | 3.07 |
| Leucine | 7.10 |
| Phenylalanine | 3.10 |
| Threonine | 3.97 |
| Tryptophane | 0.9 |
| Valine | 4.69 |
| Crude protein content | 73% |

Thus, the product is by no means inferior to other petroleum proteins.

EXAMPLE 3

A case wherein a mixture of isoparaffines, olefins and n-paraffines is used as raw material:

| Isoparaffines ($C_{10} – C_{20}$) | 20 wt.% |
|---|---|
| α-Olefins ($C_{12}, C_{14}$) | 30 |
| n-Paraffines ($C_{10} – C_{20}$) | 50 |

The above hydrocarbon composition was oxidized in liquid phase in the same manner as in Example 1, saponified and stayed in still state to divide into 85 percent, based on the saponification reaction product, of water soluble component and 15 percent of hydrophobic component. The same yeast bacteria as in Examples 1 and 2 were cultured by using the water soluble saponification reaction product as carbon source in the same culture liquid as in Example 1 to obtain dry microbe in a high yield of 75g per 100g of the water soluble saponification reaction product, together with the yeast and bacterium. Amino acid composition and protein content were the same as above.

What is claimed is:

1. In a process for the production of protein in which a hydrocarbon material is subjected to liquid phase oxidation to obtain an oxygenated hydrocarbon product

PROCESS FOR PRODUCING MICROBIAL PROTEIN FROM HYDROCARBON

The present invention relates to a process for producing a protein by culturing a microorganism by using hydrocarbons as carbon source.

In the conventional process for obtaining microbial proteins, a hydrocarbon oxide such as an alcohol, ketone, aldehyde, ester, ether or fatty acid is used as material for fermentation. However, this process has demerits as will be described below. Hydrocarbon oxides (hereinafter referred to as "oxides") used as materials for fermentation are obtained by oxidation of hydrocarbons. The water soluble oxides are mainly those having less than four carbon atoms but the oxides having five or more carbon atoms are hardly soluble in water. Therefore, the oxidation products obtained by liquid phase oxidation of hydrocarbons of about five to 30 carbon atoms which are usually used and can be extracted with water are at the highest only 10 – 15 percent. In order to oxidize the hydrocarbons having a large number of carbon atoms until they can be extracted with water, the non-extracted components should be oxidized repeatedly. Therefore, the expense of the oxidation step is increased largely and it becomes meaningless to trouble to impart water solubility to the hydrocarbons. In addition, loss of the hydrocarbons due to conversion to $CO_2$ or $CO$ during the oxidation is increased. Further, if the hydrocarbons are to be oxidized until they can be extracted with water completely, formation of formic acid which inhibits the fermentation is increased.

The object of the present invention is to eliminate these demerits. The present invention is characterized by oxidizing hydrocarbons in liquid phase, then saponifying the hydrocarbon oxides with sodium hydroxide or potassium hydroxide and culturing a microorganism by using as carbon source water-soluble or hydrophilic component of the resulting saponification product (hereinafter, the water-soluble and hydrophilic components will be referred to as "water-soluble" component) to obtain microbial proteins. According to the present invention, many kinds of hydrocarbons can be used as protein source without repetition of oxidation.

Hydrocarbons used as raw material according to the present invention are usual petroleum products of five to 50 carbon atoms, preferably of 10 – 20 carbon atoms. Further, hydrocarbons containing unsaturated hydrocarbons, for example, those containing 50 percent of olefins or containing 20 percent of branched paraffins can be used as material of the process of the present invention.

A preferred embodiment of the present invention will be described with reference to the accompanying drawing. Raw hydrocarbons are introduced into an oxidation step 10 through a line 1. In the oxidation step, the oxidation is effected mainly in liquid phase and air is fed as oxygen source through a line 2. In this step, air may be added with oxygen to increase proportion of oxygen, if necessary. The oxidation reaction is carried out at a temperature in the range of 100°– 200°C under a pressure in the range of 5 – 60 Kg/cm², for example, 10 Kg/cm² in the presence or absence of a catalyst. A suitable stirring is desirable for increasing dispersion of air and contact efficiency. The reaction product of the oxidation step, i.e. hydrocarbon oxides, is introduced into a saponification step 12 through line 3.

In the saponification step, 0.5 – 2 equivalents, for example, 1.2 equivalents, of an alkali is introduced through a line 4 per equivalent corresponding to saponification value (mg-KOH/g-oxidation reaction product) of the oxidation reaction product. As alkalis, there are used mainly sodium hydroxide, potassiu, hydroxide, sodium carbonate, sodium hydrogencarbonate, potassium carbonate, potassium hydrogencarbonate and mixtures of these compounds. The alkalis are used in the form of aqueous solutions, alcohols or aqueous alcohols. For example, in case aqueous sodium hydroxide solution is used as the alkali, its concentration may be 2 – 30 percent. The saponification reaction in the saponification step is effected at a temperature in the range of 100° – 140°C under a pressure higher than 1 atm. The reaction product in the saponification step comprises alkali salts of fatty acids, alcohols, ketones, aldehydes, water, excessive alkali, unreacted hydrocarbons, etc.

The reaction product from the saponification step is then introduced in a separation step 13 through a line 5 and divided into water soluble component and water insoluble component. The water-soluble component herein comprises alkali salts of carboxylic acids of two to 30 carbon atoms as principal ingredients, alcohols of one to 10 carbon atoms and fatty acids of two to 10 carbon atoms and sometimes contains small amounts of ketones, esters and ether aldehydes. If an alkali is fed in an amount more than the equivalent corresponding to the saponfication value to effect the saponification reaction completely, the carboxylic acids are fully converted into their alkali salts. In the separation step, a suitable quantity of water may be introduced through a line 6, if necessary. The separated hydrophobic component is taken out through a line 7 or sent into the oxidation step 10 through a line 8 and oxidized again.

Water-soluble component is introduced in a fermentation step 14 through a line 9. In the fermentation step, a microorganism is cultured by using as carbon source the water soluble component of the saponfication reaction product. As the microorganisms used in the fermentation step, there may be mentioned bacteria and yeasts, but it is not limited to such microorganisms. As for composition of culture liquid, it comprises water soluble component of the saponification reaction product obtained according to this process as carbon source and usual nitrogen sources such as ammonium nitrate, urea, ammonium phosphate and inorganic acids as growth nutrients of the microorganism. The composition of the media is suitably prepared to contain inorganic salts such as socium, potassium, magnesium, phosphorus, iron, manganese and zinc. It is further advantageous to incorporate a small amount of an organic nutrient such as yeast, extract, corn steep liquor or waste molasses, if desired.

A microorganism is cultured by using a culture liquid prepared as above. The culture is effected by a usual method such as aerated culture under stirring. Oxygen required for the growth of a microorganism is supplied suitably by air. If necessary, air of an increased oxygen content is introduced in the culture liquid under atmospheric pressure or elevated pressure. Temperature of the culture liquid is suitably 25° – 35°C and suitable pH of the liquid is in the range of 5.0 – 8.0. Protein content of the microorganism thus obtained is 40 – 75 percent.

which is then used as a source of carbon in the culture of a microorganism, the improvement which comprises: (a) adding to the oxygenated hydrocarbon product an amount of an alkali at least equivalent to the saponification value of said product and saponifying the saponifiable content thereof at a pressure above one atmosphere at a temperature in the range from 100° to 140°C., said alkali being selected from the group consisting of the hydroxides, carbonates and bicarbonates of sodium and potassium and mixtures thereof, (b) separating the water soluble and water insoluble components of the resulting mixture, and (c) employing said water soluble component as the source of carbon for culturing said microorganism to produce protein.

* * * * *